United States Patent
Ibar

(10) Patent No.: US 6,586,041 B1
(45) Date of Patent: Jul. 1, 2003

(54) TRANSPARENT STATIC DISSIPATIVE COATING COMPOSITIONS

(75) Inventor: Jean Pierre Ibar, Greenwich, CT (US)

(73) Assignee: Goex Corporation, Janesville, WI (US)

( * ) Notice: Subject to any disclaimer, the term of this patent is extended or adjusted under 35 U.S.C. 154(b) by 0 days.

(21) Appl. No.: 09/530,679

(22) Filed: May 2, 2000

Related U.S. Application Data

(60) Provisional application No. 60/107,401, filed on Nov. 6, 1998.

(51) Int. Cl.$^7$ .............................. B05D 3/00; B05D 5/12; C08K 3/20
(52) U.S. Cl. .................. 427/58; 427/385.5; 427/393.5; 427/340; 524/501
(58) Field of Search .............................. 427/58, 385.5, 427/393.5

(56) References Cited

U.S. PATENT DOCUMENTS

| | | | |
|---|---|---|---|
| 4,098,933 A | 7/1978 | Burkhardt et al. | 427/379 |
| 4,431,764 A | 2/1984 | Yoshizumi | 524/409 |
| 4,571,361 A | 2/1986 | Kawaguchi et al. | 428/328 |
| 4,734,319 A | 3/1988 | Doi et al. | 428/216 |
| 4,910,645 A | 3/1990 | Jonas et al. | 361/525 |
| 4,959,430 A | 9/1990 | Jonas et al. | 526/257 |
| 5,035,926 A | 7/1991 | Jonas et al. | 427/393.1 |
| 5,204,177 A | 4/1993 | Sato et al. | 428/328 |
| 5,300,575 A | 4/1994 | Jonas et al. | 525/186 |
| 5,415,893 A | 5/1995 | Wiersma et al. | 427/385.5 |
| 5,508,370 A | 4/1996 | Reiff et al. | 528/45 |
| 5,543,084 A | 8/1996 | Kinlen et al. | 252/500 |
| 5,631,311 A | 5/1997 | Bergmann et al. | 523/333 |
| 5,693,737 A | 12/1997 | Reiff et al. | 528/45 |

FOREIGN PATENT DOCUMENTS

| | | |
|---|---|---|
| DE | 42 29 192 A1 | 9/1992 |
| EP | 0 339 340 | 4/1989 |
| EP | 0 340 512 | 11/1989 |

OTHER PUBLICATIONS

Material Safety Data Sheet (MSDS) for Baytron–CPUD2, Aqueous Polyurethane Dispersion Product of Bayer AG dated Jul. 16, 1998 (8 pages).

Introduction and Table of Contents sections from *Plastic in ESD Applications*, bcc Report P–099R, from the bcc Corporation (203 853 42 66), 16 pages (as printed from the Internet), published Jan. 1992.

Generic Requirements for ESD–Protective Circuit Pack Containers, Bellcore, Bell Communications Research, Generic Requirements, GR–1421–CORE, issue 2, 56 pages, Jun. 1995.

Primary Examiner—Kelechi Egwim
(74) *Attorney, Agent, or Firm*—Kinney & Lange P.A.

(57) ABSTRACT

A method of preparing an article using an electrostatic dissipative composition prepared by combining a conductive polymer, and a crosslinking agent to form a fluidized dispersion, and providing the fluidized dispersion with a pH of about 7 to 9.

37 Claims, No Drawings

TRANSPARENT STATIC DISSIPATIVE COATING COMPOSITIONS

CROSS-REFERENCE TO RELATED APPLICATION(S)

Provisional Application S/N 60/107,401 that was filed on Nov. 6, 1998

BACKGROUND OF THE INVENTION

The present invention generally relates to an electrostatic dissipative (ESD) composition for preparing films and/or coating substrates. More particularly, the present invention relates to a method of forming a transparent, water-based, electrostatic dissipative composition, to a method of using the composition to form an electrostatic dissipative film on a substrate, and to a method of using the composition to form an electrostatic dissipative article.

Many plastics are prized for their insulating ability that is derived from the relatively high electrical surface resistance of these plastics. Unfortunately, high electrical surface resistance is an undesirable property in some applications since the high electrical surface resistance will typically allow build-up or accumulation of static electricity charge on outer surfaces of the plastic. This static electricity charge accumulation is problematic in and of itself because the accumulated charge may attract migrant dust particles and cause the surface of the plastic to collect dust.

Furthermore, under certain circumstances which commonly occur, the accumulated static electricity charge may discharge to adjacent articles. Electrical components, such as computer chips, and electronic products, such as computers, televisions, and other industrial or consumer goods are frequently wrapped in plastic, such as by shrink wrapping, due to the relatively low cost of such packaging methods. However, this method of packaging electronic components and articles has not realized its full potential because of the damage and/or destruction that discharges of static electricity may cause to packaged electronic components and articles.

There have been numerous attempts to develop acceptable coatings and compositions for plastics that are capable of minimizing the amount of static electricity charge development on the surface of plastic packaging materials. However, despite advancing the knowledge base with regard to static dissipative materials, these efforts have not been entirely satisfactory for a variety of different reasons. One approach involves incorporation of anti-static material into the polymer matrix of the plastic packaging materials. Quaternary ammonium compounds and amine-type compounds are known internal anti-static materials that function by attracting moisture from the surrounding environment to create a conductive layer of surface moisture on the plastic packaging material. However, these types of internal anti-static compounds require a relative humidity of at least about 15% in the surrounding environment to perform effectively. Thus, the practical applications of these types of internal anti-static materials are limited, since packaged electronic components and products are frequently shipped from, through, or to arid parts of the world with relative humidities of less than 15%. Furthermore, conductive surface moisture layers that are created by these internal anti-static compounds quickly lose their effectiveness when conditions change that cause evaporation of the moisture and under conditions when the package is jostled or otherwise subject to surface contact with other articles being shipped, with conveying equipment, or with the shipping equipment itself.

Other traditional types of internal anti-static materials include conductive fillers, such as carbon black, metallic powder, fibers, and inherently dissipative polymers (IDP), such as polypyrroles and polyanilines. Traditional conductive fillers, such as carbon black, metallic powder, and metallic fibers are problematic, because each of these materials reduces the transparency of the plastic packaging material. For aesthetic reasons, as well as practical reasons, it is desirable that packaging materials be highly transparent. For example, a high level of transparency is needed to permit inspection of the goods in the package through the packaging material using a variety of different methods, including, but not limited to, automated bar code inspection, without the need to physically open the package.

Inherently dissipative polymers (IDP), such as the polypyrroles and polyanilines, may also create transparency problems when incorporated at the relatively high concentrations needed to effect adequate static discharge properties in the plastic packaging materials. Additionally, IDP polymers are relatively high cost, which limits use of IDP polymers to packaging only the most valuable and costly electronic components and products. Furthermore, since IDP polymers typically are thermally stable only up to relatively low temperatures of about 200° C., or so, the physical ability to internally incorporate IDP polymers into plastic packaging materials is severely limited. For example, at the hot temperatures typically required during conventional polymer processing, such as extrusion and injection molding, many anti-static IDP polymers are incapable of withstanding the high temperatures and are damaged or destroyed, thereby rendering the IDP polymers that are incorporated useless for purposes of providing electrostatic discharge properties to the plastic packaging materials.

As an alternative to internally mixing or filling a plastic packaging material with an electrostatic dissipative substance, a film of an electrostatic dissipative material may be applied onto one or both sides of the plastic packaging material. A number of attempts have been made to create such a packaging material that incorporates a film of electrostatic dissipative material onto a plastic substrate. Though these various approaches have advanced the knowledge base with respect to electrostatic dissipative packaging materials, none of these approaches have optimally addressed and achieved a satisfactory balance of the various properties that such electrostatic dissipative packaging should have.

Aside from sometimes being difficult to achieve individually, achieving an optimal combination of these different properties is a very difficult challenge, since several of these properties are based upon variables that conflict with each other. First, both the electrostatic dissipative film or coating and the electrostatic dissipative packaging material should desirably be economical to produce. Thus, the electrostatic dissipative substance that is incorporated preferably should be a low cost substance, incorporated at a relatively low concentration, or be both low in cost and incorporated at a relatively low concentration. Additionally, the ESD coating should preferably be highly transparent and without color. These properties are desirable to allow for quick visual inspection of the packaged contents and machine-based inspection of the contents, such as automated bar code inspection, without the need to open the package.

Also, the completed electrostatic dissipative film or coating should preferably have a relatively high surface resistivity that minimizes or prevents charge accumulation in the ESD coating or film and in the ESD packaging product. The surface resistivity of the ESD coating should preferably be adequate to minimize or prevent dust buildup on the packaging material and should also preferably be adequate to prevent a level of current discharge that either damages the packaged goods or that causes discomfort or fear in persons touching the packaged product.

Furthermore, the ESD coating or film should preferably have a very low level of ion contamination and a relatively neutral pH ranging from about 6 to about 9 standard pH units, especially when used for packaging electronic components and articles. Tramp ions, such as chloride, sulfate, phosphate, fluoride, nitrite, bromide, nitrate, and silicon, that escape from the ESD coating or film of the ESD packaging material are often highly corrosive and detrimental to electronic components that are encapsulated in the ESD packaging material. The relatively neutral pH of the ESD composition will further help prevent corrosive damage to products encapsulated in the ESD packaging material. This eliminates ESD substances, such as polyaniline and polypyrroles, that require a low pH environment to maintain the surface resistivity of the conductive polymer.

Packages that are being shipped frequently encounter a wide variety of different atmospheric conditions, such as widely changing levels of relative humidity and widely varying temperatures. Therefore, the ESD coating or film should preferably also experience only minimal changes in surface resistivity when going from low temperature to high temperature environments, and vice versa, and likewise should preferably also experience only minimal changes in surface resistivity when passing from low relative humidity to high relative humidity environments, and vice versa.

Besides the finished ESD or film, properties exhibited during formation of the ESD coating or film are also important. For example, environmental and safety considerations dictate that the ESD composition should preferably contain little if any concentration of volatile organic compounds (VOCs). Also, the ESD composition that is used to form the ESD coating or film will preferably be capable of easy application to the plastic substrate of the packaging material and formation of uniformly thin ESD coatings or layers on the substrate. This is a difficult proposition, since the ESD substances in the ESD composition should also remain uniformly dispersed within the composition over relatively long periods of time, such as 30 to 60 days or more. Also, the ESD substance should not flocculate, agglomerate, or precipitate to any significant degree in the ESD composition over these relatively long periods of time of 30 to 60 days or more.

Steric and electrostatic properties are typically imparted to individual ESD particles to help maintain this desired stability of the ESD substance in the ESD composition. However, the steric and electrostatic effects pose significant barriers to uniform film formation once the ESD composition is spread on the substrate and the suspending water and/or solvents of the composition are evaporated. Thus, what is needed to maintain a uniform dispersion and suspension of the ESD substance in the ESD composition is deleterious for uniform film formation due to impedance of uniform intermixing of the ESD substance in the coating during and after removal of water and hydrophillic solvents. Thus, these competing variables of uniform dispersability and suspendability in the ESD composition along with achievement of uniform coating or film thickness are inherently inconsistent with each other and present complex competing variable problems.

The applied ESD coating should preferably also possess a relatively fast cure time on the order of a minute or less at relatively low temperatures to support fast, automated ESD composition application and ESD coating or film formation. Finally, the ESD coating or film should also possess a variety of different properties that permit and support post-application processing. For example, after application of the ESD composition and evaporation of water and any solvent, the in-process ESD coating or film should beneficially be capable of surviving thermoforming operations without losing any significant degree of surface resistivity or transparency. Thermoforming is typically accomplished with pressing or vacuum equipment that incorporates heating devices to make the in-process ESD coating or film soft and pliable before the coating or film is deformed by a plunger or via vacuum in a mold. Thus, the in-process ESD coating or film should preferably have certain mechanical properties to survive the conditions encountered during thermoforming.

For example, the in-process ESD coating should preferably have a modulus of elasticity that is in the rubbery range at the thermoforming temperature to accommodate the large deformations that are imposed by deep drawing during the thermoforming process. Thus, the glass transition temperature ($T_g$) of the in-process ESD coating or film should beneficially be less than the temperature encountered during thermoforming. Also, the in-process ESD coating or film should preferably have adequate tensile strength and an adequate degree of elongation at break to avoid damaging the ESD coating or film during the deformation that occurs when thermoforming. The ESD coating or film should also remain adhered to the plastic packaging material or substrate without delamination over relatively long periods of time such as 30 to 60 days, or more. Consequently, the completed ESD coating or film should have a thermal expansion coefficient that is compatible during the conditions of use, storage, and shipping, with any polymer substrate to which the ESD coating or film is bonded.

Thus, there are a number of different properties, including some properties that compete with other properties, that should be possessed by the ESD coating composition, the ESD coating or film, or by the in-process ESD coating or film during transformation from the ESD composition to the ESD coating or film. None of the presently known or existing ESD coating compositions support optimal achievement of these various properties. Therefore, despite an abundance of work on ESD coatings and compositions, a need still remains unfilled for an improved ESD coating composition that possesses an optimal combination of the variety of different properties discussed above and optimally achieves the combination of desirable properties discussed above during and after formation of ESD coatings and films. The present invention provides a solution that achieves these beneficial properties in both ESD compositions and ESD coatings.

BRIEF SUMMARY OF THE INVENTION

The present invention includes a method of preparing an electrostatic dissipative composition. This method includes combining a conductive polymer; a crosslinkable polymer, and a crosslinking agent to form a fluidized dispersion, and providing the fluidized dispersion with a pH of about 7 to 9 to form the electrostatic dissipative composition. The present invention further includes an electrostatic dissipative composition and a method of making an article.

DETAILED DESCRIPTION

The present invention generally relates to an electrostatic dissipative (ESD) composition for coating substrates with an ESD coating and for preparing ESD films and ESD articles.

More particularly, the present invention relates to a method of forming a transparent electrostatic dissipative (ESD), water-based composition, to a method of using this ESD water-based composition to form the ESD coating on a substrate, and to a method of using this ESD water-based composition to form the ESD film or the ESD article.

The electrostatic dissipative (ESD) composition of the present invention includes both a conductive polymer and a crosslinkable polymer, such as a blocked urethane polymer. The conductive polymer is combined with water and, optionally, one or more water-miscible organic solvents, to form an aqueous conductive polymer dispersion. The crosslinkable polymer is likewise combined with water and, optionally, one or more water-miscible organic solvents, to form an aqueous carrier dispersion. The aqueous carrier dispersion may optionally include one or more polymers and one or more prepolymers to impart particular desired characteristics to the aqueous carrier dispersion and to derivatives of the aqueous carrier dispersion.

After the aqueous conductive polymer dispersion and the aqueous carrier dispersion are prepared, the aqueous conductive polymer dispersion and the aqueous carrier dispersion are combined to form the ESD composition. The aqueous conductive polymer dispersion and the aqueous carrier dispersion are combined under conditions of mild mixing that are adequate to uniformly disperse the components of the aqueous carrier polymer dispersion with the aqueous conductive polymer dispersion and the other components of the ESD composition. Examples of commercially available forms of the ESD composition include the STATEX line of ESD compositions, such as the STATEX 22 ESD composition, that are available from Goex Corporation of Janesville, Wis.

The ESD composition is then coated onto a substrate. The substrate that contains the coating of the ESD composition is then subjected to drying conditions that are adequate to drive off the water and any water-miscible organic solvent(s). After the water and any water-miscible solvents have been driven off, the substrate with the coating of the ESD composition is subjected to conditions that are adequate to remove cause curing (crosslinking) of the crosslinkable polymer (and removal of the block in the case of the blocked urethane polymer) to strengthen the coating of the ESD composition.

The conductive polymer is dispersed and secured within the matrix of the crosslinked polymer and the other optional polymer(s) that were present in or derived from the aqueous carrier dispersion in the dried and cured coating of the ESD. After the drying and curing steps have been completed, the substrate and the attached coating of the ESD composition may be subjected to a shaping operation, such as a thermoforming operation. The modulus and tensile strength properties contributed by the crosslinked polymer component of the coating of the ESD composition (i.e. the ESD coating) are sufficient to prevent breakage or cracking of the coating of the ESD coating during thermoforming of the coated substrate. The properties of the ESD coating, such as the thermal expansion coefficient of the ESD coating, are likewise adequate to prevent delamination of the substrate and the ESD coating, both during and subsequent to any included shaping process.

The substrate on which the ESD coating is applied may be an article, such as a plastic vehicle component, including, but not limited to a plastic automobile component, a plastic truck component, a plastic boat component, or a plastic airplane component. Some non-exhaustive examples of such plastic automobile components include plastic bumpers, quarter panels, and side panels. As another example, the plastic article on which the ESD coating is placed may be an electronic component, such as an integrated circuit. Still another example of the plastic article on which the ESD coating may be is placed is a mold. In this application, a release agent may optionally be applied to the mold prior to application of the ESD composition and formation of the ESD coating. Thereafter, after drying and curing the applied ESD composition, the ESD coating may be removed from the mold to form an ESD film. Consequently, the ESD film is entirely based upon components that were originally present in the ESD composition. The optional release agent, if used, should not have any properties or characteristics that will damage or degrade articles, such as electrical components, that the ESD film is later used with or applied to. Preferably, a release agent is not used.

As another alternative, the ESD composition may be applied onto a sheet (or web) of plastic. After drying and curing the ESD composition, the composite of the plastic sheet and the ESD coating collectively constitute an ESD laminate. This ESD laminate may be used as an ESD packaging material. Consequently, the ESD laminate may be shaped, such as by thermoforming, to form a package in which a product is subsequently placed. Alternatively, the ESD laminate may be wrapped around the product and subsequently shrink-wrapped in conventional fashion, by application of heat, to form ESD packaging material that closely conforms to the shape of the product packaged within the ESD packaging material.

As another alternative, the plastic substrate may be extruded to have a two-dimensional profile using conventional profile extrusion equipment, and the coating of the ESD composition may thereafter be coated on one or more sides of the plastic, profile-extruded, substrate. The plastic, profile-extruded, substrate that has been coated with the ESD composition, after drying and curing of the ESD composition, may be positioned over the product and thereafter shrink-wrapped in conventional fashion, by application of heat, to form ESD packaging material that closely conforms to the shape of the product packaged within the ESD packaging material.

The ESD coating for articles and the ESD packaging material of the present invention offer a number of beneficial properties. For example, the ESD composition may be formulated to provide the ESD coating for articles and the ESD packaging material with a level of surface resistivity that is adequate to either minimize or preferably prevent dust buildup on the ESD coating or the ESD packaging material. Furthermore, provision of this level of surface resistivity will prevent any discomfort or fear to persons who touch the article that includes the ESD coating or products that are packaged in the ESD packaging material, since charge buildup at the surface of the ESD coating and at the surface of the ESD packaging material will be substantially minimized or even eliminated. Preferably, to reflect the beneficial properties, the surface resistivity of the ESD coating and of the ESD packaging material, after drying and curing of the applied ESD composition, ranges from about $10^4$ to $10^{12}$ Ohm/sq.

Also, the ESD coating, the ESD laminate, and the ESD packaging material, after drying and curing of the ESD composition, have been found to be highly transparent and essentially colorless. Preferably, the ESD coating, after drying and curing of the ESD composition, has a high degree of transparency that permits at least about 85% transmission of visible light with a wavelength ranging from about 410 nanometers to about 700 nanometers, more preferably at least about 90% transmission of visible light with a wavelength ranging from about 410 nanometers to about 700 nanometers, and still more preferably at least about 95% transmission of visible light with a wavelength ranging from about 410 nanometers to about 700 nanometers through an about 2.5 micron thick sample of the ESD coating. Such a high degree of visible light transmission capability ensures that quick visual inspection and machine-based inspection of articles, such as electronic components, including integrated circuits, may take place, without the need to break or disturb the ESD coating.

In addition to the ESD coating, the ESD laminate and the ESD packaging material similarly also exhibit a very high degree of visible light transmission. Preferably, the ESD laminate and the ESD packaging material, after drying and curing of the ESD composition to form the ESD coating, each have a high degree of transparency that permits at least about 80% transmission of visible light with a wavelength ranging from about 410 nanometers to about 700 nanometers, more preferably at least about 88% transmission of visible light with a wavelength ranging from about 410 nanometers to about 700 nanometers, and still more preferably at least about 90% transmission of visible light with a wavelength ranging from about 410 nanometers to about 700 nanometers through an about 40 mil thick sample of the ESD laminate, such as a composite of an about 40 mil thick sheet of plastic coated on both sides with about 2.5 micron thick layers of the ESD coating. In one preferred embodiment, an about 40 mil thick sample of the ESD laminate that is formed as a composite of an about 40 mil thick sheet of plastic polyethylene terephthalate glycol (PETG) that is coated on both sides with about 2.5 micron thick layers of the ESD coating permits at least about 87% transmission of visible light with a wavelength ranging from about 410 nanometers to about 700 nanometers.

Furthermore, after drying and curing of the ESD composition, outside surfaces of both the ESD coating and the ESD packaging material have been found to contain a very low level of ion contamination. For example, the concentration of various ions at any exposed surface of the ESD packaging material and at any exposed surface of the ESD coating, when used to package or coat goods susceptible to corrosion and susceptible to damage by tramp ions, may, and preferably are, minimized in accordance with the concentration values provided in Table 1 below:

TABLE 1

| Ion | Concentration (micrograms per square centimeter) |
| --- | --- |
| Fluoride | <0.06 |
| Chloride | <0.005 |
| Nitrite | <0.003 |
| Bromide | <0.01 |
| Nitrate | <0.08 |
| Phosphate | <0.02 |
| Sulfate | <0.02 |

This is important when the ESD coating and the ESD packaging material are used in connection with goods, such as electronic components, that could be damaged by transfer of ions from packaging materials and coatings.

Next, the electrical characteristics of the ESD coating and of the ESD packaging material have been found to remain relatively stable, even when exposed to the widely varying ranges of relative humidity and temperature that may be expected during shipment from one location to another, during distribution of goods that are packaged in the ESD packaging material or coated in the ESD coating. First, the ESD coating and the ESD packaging material are each relatively stable, with respect to changes in the surface resistivity, even when held at elevated temperatures over relatively long periods of time, such as 30 days or more. Preferably, when held for about 30 days or more at a temperature of about 100° C., the surface resistivity of the ESD coating and of the ESD packaging material changes by about $5 \times 10^5$ Ohm/sq., or less. Also, during a period of 30 days in a room with the temperature of about 72° C. at a relative humidity of about 80%, the surface resistivity of the ESD coating and of the ESD packaging material preferably changes by only about $10^5$ Ohms/sq., or less. Besides having a relatively stable range of surface resistivity during relatively harsh environmental conditions, the ESD coating, whether present on the article or on the sheet of plastic as part of the ESD packaging material, does not exhibit any cracking or hazing and does not exhibit any delamination from the substrate, such as the article or the sheet of plastic, when exposed to relative or environmental conditions, such as about 80% relative humidity at about 72° F. or about 35% relative humidity at about 100° C., even after being held in these conditions for a period of about 30 days, or more.

As explained previously, the ESD composition incorporates the aqueous conductive polymer dispersion and the aqueous carrier dispersion. The aqueous conductive polymer dispersion includes water, a blend of the conductive polymer and a counter ion polymer, and optionally, one or more water-miscible organic solvents. The conductive polymer may be any polythiophene. For example, the conductive polymer may be any of the polythiophenes that are disclosed in U.S. Pat. Nos. 4,910,645 and 4,959,430. Consequently, the entirety of U.S. Pat. No. 4,910,645 that issued on Mar. 20, 1990 and the entirety of U.S. Pat. No. 4,959,430 that issued on Sep. 25, 1990 are hereby incorporated by reference. In addition to disclosing the various polythiophenes that may be the conductive polymer of the present invention, U.S. Pat. Nos. 4,910,645 and 4,959,430 also describe various methods by which the various polythiophenes may be prepared. One preferred polythiophene that may be the conductive polymer of the present invention is 3,4-polyethylene dioxythiophene.

The counter ion polymer that is incorporated in the aqueous conductive polymer dispersion as part of the blend that is also based upon the conductive polymer balances the charge present on the backbone of the conductive polymer. One example of the counter ion polymer is polystyrene sulfonate. In the aqueous conductive polymer dispersion, though not wishing to be bound by theory, it is thought that the blend of the conductive polymer and the counter ion polymer forms as a result of electrical interaction, or even bonding, between an anionic portion or group of the counter ion polymer and a cationic portion or group of the conductive polymer.

This theoretical interaction between the conductive polymer and the counter ion polymer is thought to be demonstrated by physical phenomena observed in micrographs. Specifically, upon drying and curing of the ESD composition that is based upon the aqueous conductive polymer dispersion (in the form of the blend of 3,4-polyethylene dioxythiophene and polystyrene sulfonate that is dispersed in water), the aqueous carrier dispersion (in the form of a crosslinkable aliphatic carbonate polyurethane that is dispersed in water), n-methyl-2-pyrrolidone, and triethylamine, two distinct types of particles are observed. First, relatively large particles with a nominal diameter on the order of about 0.7±0.1 micron are observed. These relatively large particles are thought to be crosslinked form of the aliphatic carbonate polyurethane. Also, relatively small, round particles with a nominal diameter of about 22±4 nanometers are observed. These relatively small, round particles are thought to be an interacting blend or combination of the conductive polymer and the counter ion polymer. This interacting blend or combination that is thought to be seen in the micrograph is believed to be a result of electrical interaction, or even bonding, between the sulfonate group (anion group) of the polystyrene sulfonate and a cationic portion or group of the 3,4-polyethylene dioxythiophene. These relatively small, round particles that are though to be the blend or combination of the conductive polymer and the counter ion polymer are thought to be present in the aqueous conductive polymer dispersion as colloids. Consequently, the aqueous conductive polymer dispersion is considered to be a colloidal dispersion.

The conductive portion of the blend of the conductive polymer and the counter ion polymer, such as the blend of 3,4-polyethylene dioxythiophene and polystyrene sulfonate, that is dispersed in the aqueous conductive polymer dispersion has very good stability characteristics, since the aqueous conductive polymer dispersion does not lose any significant amount of liquid conductivity at temperatures of about 220° C., even after 25 hours of such exposure, and does not show any significant loss of liquid conductivity at room temperature for extended periods, such as at least about one full year, or more.

One preferred from of the aqueous conductive polymer dispersion is commercially available from Bayer AG of Leverkusen, Germany under the trade name TP A1 4071. The Bayer TP A1 4071 product is a colloidal dispersion that incorporates 0.5 weight percent poly(3,4-ethylene) dioxythiophene, 0.8 weight percent polystyrene sulfonate, and 98.7 weight percent deionized distilled water, based on the total weight of the colloidal dispersion. The Bayer TP A1 4071 product has a density that is about the same as the density of water and a pH of about 1 to about 2 standard pH units. Beneficially, the Bayer TP A1 4071 product does not lose any significant amount of liquid conductivity at higher pHs, such as about 7 to about 9.

The aqueous carrier dispersion that is blended with the aqueous conductive polymer dispersion to form the ESD composition of the present invention may be an aqueous dispersion of a crosslinkable polymeric carrier, such as an anionic dispersion of a crosslinkable polyurethane (an aliphatic carbonate polyurethane, for example). U.S. Pat. No. 4,098,933 (issued on Jul. 4, 1978) and U.S. Pat. No. 5,693,737 (issued on Dec. 2, 1997) each disclose a variety of different aliphatic carbonate polyurethanes, anionic dispersions containing aliphatic carbonate polyurethanes, and methods of preparing both the aliphatic carbonate polyurethanes and anionic dispersions of the aliphatic carbonate polyurethanes.

The aliphatic carbonate polyurethane that may be used in preparing the aqueous carrier dispersion of the present invention may be any of the aliphatic carbonate polyurethanes disclosed in either of U.S. Pat. Nos. 4,098,933 and 5,693,737. Similarly, any of the aliphatic carbonate polyurethanes incorporated in the aqueous carrier dispersion of the present invention may be prepared in accordance with any of the aliphatic carbonate polyurethane preparation methods disclosed in either of U.S. Pat. Nos. 4,098,933 and 5,693,737. Likewise, the aqueous carrier dispersion of the present invention may be any of the aqueous carrier dispersions (dispersion of aliphatic carbonate polyurethane in water and, optionally, also in water-miscible organic solvent (s)) disclosed in either of U.S. Pat. Nos. 4,098,933 or 5,693,737. Furthermnore, the aqueous carrier dispersion that is used in preparing the ESD composition of the present invention may be prepared in accordance with any of the aqueous carrier dispersion preparation methods disclosed in either of U.S. Pat. Nos. 4,098,933 or 5,693,737. Consequently, the entirety of U.S. Pat. No. 4,098,933 and the entirety of U.S. Pat. No. 5,693,737 are hereby incorporated by reference.

Both U.S. Pat. No. 4,098,933 and U.S. Pat. No. 5,693,737 concern the modification of an organic polyisocyanate to form a blocked urethane polymer that includes carbonate groups. In one preferred embodiment of the present invention, allyl diglycol carbonate, which is available as CR-39® monomer from PPG Industries, Inc. of Pittsburgh, Pa., is used as the base monomer that is reacted with unsaturated molecules containing either isocyanate or hydroxyl groups to form the blocked urethane polymer that incorporates carbonate groups. Thereafter, the blocked urethane polymer, which is water-dispersible, is dispersed in water, and optionally also in water-miscible solvent(s) to form the aqueous carrier dispersion.

Some suitable examples of the aqueous carrier dispersion that may used for forming the ESD composition of the present invention are any of the BAYHYDROL® polyurethane dispersions and any of the IMPRANIL® polyurethane dispersions that are available from Bayer AG of Pittsburgh, Pa. Two preferred forms of the BAYHYDROL® polyurethane dispersion are the BAYHYDROL® 121 polyurethane dispersion and the BAYHYDROL® 123 polyurethane dispersion. The aqueous carrier dispersion may include any of the BAYHYDROL®, IMPRANIL®, or BAYTRON® polyurethane dispersions, either individually, or in any combination.

The ESD composition of the present invention may be prepared by first combining the aqueous conductive polymer dispersion, a crosslinking agent, such as an amine, and the optional water-miscible organic solvent, such as n-methyl-2-pyrrolidone. Preferably, when the crosslinking agent, such as the amine, also acts as a pH modifier, the crosslinking agent is slowly added to the combination of the aqueous conductive polymer dispersion and the optional water- miscible organic solvent, in drop-wise fashion, with slow and uniform mixing after each addition of several drops of the crosslinking agent until the pH of the solution stabilizes, to minimize any opportunity for particle agglomeration, flocculation, or precipitation in the solution.

After addition of the crosslinking agent has been completed, the mixture of the aqueous conductive polymer dispersion, the crosslinking agent, and the optional water-miscible organic solvent is then mixed for about 2 minutes in the mix vessel with light agitation to obtain a uniform blend of the aqueous conductive polymer dispersion, the crosslinking agent, and the optional water-miscible organic solvent. Thereafter, the aqueous carrier dispersion, such as the polyurethane dispersion, is added to the blend of the aqueous conductive polymer dispersion, the crosslinking agent, and the optional water-miscible organic solvent in the mix vessel. The contents of the mix vessel are then mixed for about 5 minutes with light agitation to obtain a uniform blend of the aqueous conductive polymer dispersion, the crosslinking agent, the optional water-miscible organic solvent, and the aqueous carrier dispersion.

Besides the aqueous conductive polymer dispersion and the aqueous carrier dispersion, a number of other ingredients may optionally be included in the ESD composition. For example, thickeners, such as any TEXANOL® thickener that is available from Eastman Kodak of Kingsport, Tenn., and COLLACRAL® VL thickeners available from BASF Corporation of Mt. Olive, N.J.; flow aids, such as the SILWET® L-77 flow aid available from Union Carbide of Danbury, Conn., FLUORAD® FC-430 flow aid that is available from Minnesota Mining and Manufacturing Company of Maplewood, Minn., LODYNE® S-100 flow aid that is available from Ciba-Geigy of Basel, Switzerland, and AEROSOL® OT-S thickener that is available from American Cyanamid Corporation of Parsippany, N.J.; defoaming agents, such as FOAMASTER® NS-1 defoaming agent and NOPCO® NDW defoaming agent that are each available from Henkel Corporation of Gulph Mills, Pa., and DEEFO® 97-2 defoaming agent from Ultra-Adhesives; flattening agents, such as SYLOID® 169 flattening agent or SYLOID® 234 flattening agent that are each available from Grace Davison of Columbia, Md.; a coupling agent; a leveling agent; a photosensitizer; and antioxidant; an ultraviolet light absorber; a stabilizer; a rheology control agent; and any of these in any combination.

These optional additional ingredients may typically be added after addition of the aqueous carrier dispersion. However, care should be exercised in selecting any of these optional additional ingredients to be included in the ESD composition. Specifically, when the ESD coating or ESD film will be in contact with articles or products, such as electronic components, that may be damaged by contact with tramp ions, only optional additional ingredients that are free of measurable amounts of tramp ions, such as chloride, sulfate, phosphate, fluoride, nitrite, bromide, nitrate, and silicon ions, should be selected.

Besides water, the aqueous conductive polymer dispersion, the aqueous carrier dispersion, and the ESD composition may also include one or more water-miscible organic solvents. While the water-miscible organic solvent(s) may be present in the aqueous conductive polymer dispersion and in the aqueous carrier dispersion, the water-miscible solvent, when other than n-2-methyl-pyrrolidone or isopropanol, is preferably added as part of the ESD composition, after combination of the aqueous conductive polymer dispersion and the aqueous carrier dispersion, to prevent generation of any solution instability in the ESD composition. The water-miscible organic solvent may be generally present in the ESD composition at a concentration ranging from about 15 weight percent to about 50 weight percent, based upon the total weight of the ESD composition. Any water-miscible organic solvent(s) that are present in the aqueous conductive polymer dispersion and in the aqueous carrier dispersion addition should be present at a concentration that permits achievement of the about 15 weight percent to about 50 weight percent concentration range of the water-miscible solvent in the ESD composition.

Some nonexhaustive examples of the water-miscible organic solvent include alkyl alcohols having one to five carbons, such as methanol, ethanol, n-propanol, isopropanol, n-butyl alcohol, sec-butyl alcohol, tert-butyl alcohol, isobutanol, n-pentanol, etc.; oxyethylene or oxypropylene addition dimers, trimers, or polymers, such as diethylene glycol, triethylene glycol, tetraethylene glycol, dipropylene glycol, tripropylene glycol, polyethylene glycol, polypropylene glycol, etc.; alkylene glycols having an alkylene group of two to six carbons, such as ethylene glycol ethylene, propylene glycol, trimethylene glycol, butylene glycol, 1,2, 6-hexanetriol, hexylene glycol, etc.; glycerin; lower alkyl ethers of a polyhydric alcohol, such as ethylene glycol monomethyl (or monoethyl) ether, diethylene glycol monomethyl (or monoethyl) ether, triethylene glycol monomethyl (or monoethyl) ether, dipropylene glycol dimethyl ether; etc.; lower dialkyl ethers of a polyhydric alcohol, such as triethylene glycol dimethyl (or diethy) ether, tetraethylene glycol dimethyl (or diethyl) ether, etc.; N-methyl-2-pyrrolidone; xylene; 1,1,1-trichloroethane; perchloroethylene; dimethylsulfoxide, (DMSO); and any of these in any combination.

In addition to the aqueous conductive polymer dispersion, the aqueous carrier dispersion, the optional additive(s), water, and the optional water-miscible organic solvent, the ESD composition also includes the crosslinking agent, such as an amine (triethylamine, for example). Furthermore, the ESD composition may optionally include an additional polymer dispersion. Some examples of polymers that may be included in this optional additional polymer dispersion include polyvinylidene chloride; acrylates and acrylic polymers, such as polymethylmethacrylate, poly(n-butyl methacrylate), poly(isobutyl methacrylate) poly(ethyl methacrylate); cellulose acetate butyrate; polyethylene; polypropylene; polyacrylonitrile; polyvinyl acetate; polyvinyl chloride; polybutadiene; polyamide; and urethane/acrylic polymer blends. Some examples of suitable urethane/acrylic polymer blend dispersions include the FLEXTHANE® 626 and FLEXTHANE® 630 aqueous polymer dispersions that are available from Air Products and Chemicals, Inc. of Allentown, Pa. The optional additional polymer dispersion(s) may include water and/or any of the aforementioned water-miscible organic solvents, in any combination.

Though the ESD composition may permissibly include a conductive filler material (other than the conductive polymer), such as carbon black, metallic powder, and metallic fibers, the ESD composition most preferably does not include any conductive filler material, since the addition of such conductive filler material would detract from the excellent visible light transmission characteristics of the inventive ESD composition. Consequently, the ESD composition preferably includes only de minimis amounts, if any, of conductive filler material, such as carbon black, metallic powder, and metallic fibers, and is most preferably free of conductive filler material (other than the conductive polymer), such as carbon black, metallic powder, and metallic fibers. Preferably, the blend of the conductive polymer and the counter ion polymer causes at least about 95% of the liquid conductivity of the ESD composition, more preferably causes at least about 99.5% of the liquid conductivity of the ESD composition, and most preferably causes about 100% of the liquid conductivity in the ESD composition.

By way of review, after preparation, the ESD composition may be applied as an ESD coating to one or both sides of a sheet (or web) of plastic to form ESD packaging material; may be applied directly onto plastic articles, for example, an ESD primer for vehicle components or as an ESD coating on electronic components such as integrated circuits; and may be applied to a mold to permit preparation of a shaped ESD film. The ESD coating exhibits excellent binding characteristics when applied as a coating to typical transparent commercial plastics, such as polyvinyl chloride, polycarbonate, polymethyl methacrylate, polyethylene terephthalate, polybutylene terephthalate, polyethylene terephthalate glycol (for example, EASTAR® 6763 PETG that is available from Eastman Chemical Company of Eastman, Tenn.), polyacrylonitrile, and the like. Specifically, the ESD composition sticks and strongly adheres to these typical transparent commercial plastics when applied to these typical transparent commercial plastics.

The ESD composition is adaptable to a variety of different applications to a variety of different substrates, including the different transparent commercial plastics listed above. For example, the ESD composition may be applied to the substrate by any known coating application technique, such as spray coating, brush coating, roller coating, and wire drawing the ESD composition onto the substrate. Alternatively, the substrate may be dipped in the ESD composition to coat the substrate with the ESD composition.

While the ESD composition may be applied to create any thickness of the ESD coating, the ESD composition is preferably applied to a wet thickness of about 2.5 microns. This wet thickness of about 2.5 microns for the coating of the ESD composition is preferred, because thinner applications may hinder complete covering of the substrate and because thicker applications tend to be more difficult to uniformly dry and cure. After drying and curing, the about 2.5 micron wet thickness of the ESD composition provides the ESD coating with a dry thickness of about 2.5 microns. If a thicker ESD coating is desired, a first coat of the ESD composition may be applied, cured and dried, and a second coat of the ESD composition may thereafter be applied over the dried and cured first coat, then cured and dried.

The viscosity of the ESD composition may be modified, as necessary, to adapt the ESD coating composition to a particular application technique that achieves the particular coating thickness that is desired in a particular application. Typically, the Brookfield viscosity of the ESD composition ranges from about 50 to about 550 milliPascals-seconds when the temperature of the ESD composition is at room temperature, such as about 72° F. When the ESD composition is roller coated onto the substrate, the Brookfield viscosity of the ESD composition preferably ranges from about 75 to about 150 milliPascals·seconds at an ESD composition temperature of about room temperature, such as about 72° F.

The ESD composition of the present invention is a stable dispersion with a long shelf life of at least about two months. By "stable dispersion", it is meant that polymeric particles in the ESD composition do not flocculate, precipitate, or agglomerate to any significant degree after a period of at least two months, and preferably after a period of about one year, when held at a temperature ranging from about −18° C. to about 45° C. The stability of a dispersion is often a barrier to application of the dispersion as a coating. However, for the ESD composition, this stability has surprisingly been found to present no problem when the ESD composition is coated onto the substrate. Indeed, the ESD composition surprisingly forms a film of uniform thickness when applied onto the substrate. This uniform film thickness remains, even after the suspending water and any water-miscible organic solvents have been evaporated. Though not wishing to be bound by theory, it is believed that formation of the aqueous carrier dispersion as an anionic dispersion contributes to the ease of forming the ESD composition with a uniform film thickness on the substrate.

The ESD composition may be formulated to include from about 0.6 weight percent to about 1 weight percent of the blend of the conductive polymer and the counter ion polymer, such as the blend of the poly (3,4-ethylene) dioxythiophene and polystyrene sulfonate; from about 7 weight percent to about 8.75 weight percent of the crosslinkable polymeric carrier, such as the crosslinkable polyurethane (for example, the aliphatic blocked urethane polymer that incorporates carbonate groups); from about 75 weight percent to about 82.5 weight percent of the distilled deionized water; from about 7 weight percent to about 9 weight percent of the optional water-miscible organic solvent, such as N-methyl-2-pyrrolidone; and from about 0.2 weight percent to about 0.5 weight percent of the crosslinking agent, such as the amine (triethylamine, for example), based upon the total weight of the ESD composition.

In one preferred embodiment, the ESD composition includes about 71.0 to about 71.3 weight percent of the Bayer TP A1 4071 conductive polymer dispersion (as the aqueous conductive polymer dispersion of the present invention), about 23.4 to about 23.6 weight percent of the Bayer BAYHYDROL® 123 polyurethane dispersion (as the aqueous carrier dispersion of the present invention), about 0.3 to about 0.4 weight percent of triethylamine; and about 4.9 to about 5.1 weight percent of the N-methyl-2-pyrrolidone, based upon the total weight of the ESD composition.

The ESD composition is preferably formulated to contain only a minimal concentration, if any, of volatile organic compounds (VOCs), such as about 1 gram of VOC per liter of the ESD composition. More preferably, the ESD composition is formulated to contain no volatile organic compounds (VOCs) and to consequently contain zero grams of VOC per liter of the ESD composition. For purposes of this document, the definition of volatile organic compound (VOC) may be found in the Apr. 9, 1998 *Federal Register* at Vol. 63, No. 68, Pages 17331–17333.

The ESD composition is preferably formulated to and a low vapor pressure of about 2 pounds per square inch (psi), or less, at a temperature of about 72° F. This vapor of about 2 psi, or less, at a temperature of about 72° F. is predominantly caused by water, since water forms a majority of the ESD composition. Preferably, all components of the ESD composition, other than water, have a vapor pressure of about 400 mm Hg, or less, at a temperature of about 72° F., and more preferably have a vapor pressure of about 300 mm Hg, or less, at a temperature of about 72° F. Also, all components, other than water, that are present in the ESD composition at a concentration of about one weight percent, or more, based upon the total weight of the ESD composition, preferably have a vapor pressure of about 100 mm Hg, or less, at a temperature of about 72° F., and more preferably have a vapor pressure of about 10 mm Hg, or less, at a temperature of about 72° F. Furthermore, due to the low or even nonexistent level of VOCs, the ESD packaging material, ESD coating, and the ESD film release very low levels of gas or residue at elevated temperatures, such as about 200° C., and, therefore, beneficially exhibit very little, if any, outgassing at such elevated temperatures.

Prior to application of the ESD composition onto articles, such as integrated circuits, that are susceptible to corrosion and prior to application of the ESD composition onto sheets of plastic to form the ESD packaging material that will be used to package products that are sensitive to corrosion, the pH of the ESD coating composition should be adjusted to a relatively neutral pH range of about 6 to about 9 standard pH units and preferably to a pH in the range of about 7 to about 9 standard pH units. This pH adjustment may be achieved with the amine, such as triethylamine, in accordance with the previously discussed method of making the ESD composition. Surprisingly, despite this pH adjustment, the conductive portion of the blend of the conductive polymer and the counter ion polymer, such as the blend of poly(3,4-ethylene) dioxythiophene and polystyrene sulfonate, remains stable. This stability is reflected by the observation that surface resistivities in the range of about $10^4$ to about $10^{12}$ Ohm/sq. are readily achievable for the ESD coating, the ESD film, the ESD laminate, and the ESD packaging material that are based upon coating(s) of the ESD composition.

For example, the ESD composition, after extrusion of the sheet or web of plastic, may be applied to one or both sides of the plastic sheet or web using conventional coating application techniques and conventional calendering methods. Thereafter, the applied ESD composition is subjected to drying conditions that are adequate to evaporate the water and any water-miscible organic solvent included in the ESD composition. Then, after evaporation of the water and solvent, the applied ESD composition is subjected to conditions that are adequate to cause crosslinking of the crosslinkable polymer, such as removal of the block from the blocked urethane polymer that includes carbonate groups and crosslinking of the urethane polymer.

Those of ordinary skill in the art will recognize that the coating of the ESD composition may generally be dried and cured using any conventional procedure that both drives off water and any water miscible organic solvent from the ESD composition and effects crosslinking of the crosslinkable polymer of the aqueous carrier dispersion component of the ESD composition. For example, the drying and cure of the coating of the ESD composition may be accomplished using a combination of any temperature(s) and duration of exposure to the temperature(s) that is adequate to cure the coating of the ESD composition. As some non-exhaustive examples, curing of the ESD composition that includes crosslinkable polymer, such as the blocked aliphatic carbonate polyurethane, in combination with lathe crosslinking agent may be accomplished at a temperature of about 72° F. for about 40 minutes, at a temperature of about 65° C. for about 5 minutes, or at a temperature of about 85 ° C. for about two minutes.

If heat is employed for the cure step, the heat may be supplied by an oven. Alternatively, the coating of the ESD composition may be subjected to heating in an automated line using hot air convection equipment and/or infrared radiation equipment to complete the cure of the crosslinkable polymer. Alternatively, instead of relying upon temperature, the curing may be accomplished chemically by adding a silane-based crosslinking catalyst (about 0.1 weight percent to about 0.4 weight percent of the silane-based crosslinking catalyst, based on the total weight of the ESD composition) to the ESD composition immediately prior to application of the ESD composition to bring about curing of the ESD composition.

Surprisingly, even despite the low or even nonexistent level of VOCs in the ESD composition, the ESD composition dries and cures at a relatively fast rate, even at relatively low temperatures on the order of about 140° F. or less. This is advantageous since relatively fast curing at relatively low temperatures reduces the capital cost of equipment needed to dry and cure the applied ESD coating and prevents the ESD coating application, drying, and curing steps from becoming a bottleneck in coating applications using the ESD composition. In one particular application of the ESD coating, ESD coatings (each with a wet thickness of about 2.5 microns) are applied onto both sides of a plastic sheet, air dried for about 15 minutes, then oven-dried for about 30 minutes at a temperature of about 60° C. to complete drying and curing of the ESD coatings. In preparation for thermoforming, the ESD laminate of the ESD coatings and the plastic sheet may thereafter be heated in a 450° F. oven for about 38 seconds until the laminate of the ESD coating and the plastic sheet reach a temperature of about 240° F.

Prior to application of the ESD composition onto plastic substrates, such as plastic articles and plastic sheets, the plastic substrate may be subjected to a conventional glow discharge treatment to render the surface of the plastic substrate more hydrophilic. The increase in the hydrophylicity of the surface of the plastic substrate helps to enhance the rate at which the ESD composition may be applied to uniformly coat the plastic substrate and also helps to enhance bonding of the ESD composition to the plastic substrate.

If the ESD laminate is to be thermoformed to form the ESD packaging material, the ESD laminate may be heated in any conventional fashion to make the ESD laminate soft and pliable before thermoforming. For example, the ESD laminate may be heated in an oven or, alternatively, may be subjected to heating in an automated line using hot air convection equipment and/or infrared radiation equipment. The thermoforming may be conducted in any conventional thermoforming equipment, such as via vacuum in a vacuum forming process or via plunger in a pressure-based thermoforming operation. Any conventional thermoforming process may be used to shape the ESD laminate into the ESD packaging material with a desired shape.

The ESD coating, after application on the substrate, such as plastic sheet or web, to form the ESD laminate, exhibits outstanding characteristics when subject to thermoforming. For example, the dried and cured coating of the ESD composition does not lose any substantial degree of surface resistivity or transparency during thermoforming operations. Typically, depending upon the severity of any deep drawing, the surface resistivity of the ESD coating on the ESD laminate changes by about one decade (about one power of 10: for example, from about $10^4$ ohms/sq. to about $10^5$ ohms/sq., from about $10^5$ ohms/sq. to about $10^6$ ohms/sq., from about $10^6$ ohms/sq. to about $10^7$ ohms/sq., from about $10^7$ ohms/sq. to about $10^8$ ohms/sq., etc.) or less as a consequence of thermoforming the ESD laminate.

To accommodate the large deformations imposed by deep drawing during thermoforming operations, the modulus of elasticity of the dried and cured ESD coating should be in the rubbery range at the thermoforming temperature to which the dried and cured ESD coating is heated prior to and during the thermoforming operation. Consequently, the thermoforming temperature (the temperature to which the dried and cured ESD coating is heated during thermoforming) should be greater than the glass transition temperature ($T_g$) of the dried and cured ESD coating.

The modulus of elasticity and the glass transition temperature of the ESD coating, after drying and curing, may be considered to be the same, or essentially the same, as the modulus of elasticity and the glass temperature of the aqueous carrier dispersion, after drying and curing of the crosslinkable polymer, since the modulus of elasticity and glass transition temperature properties of the crosslinked polymer will fully dominate the minor or even negligible contribution of the blend of the conductive polymer and the counter ion polymer to the modulus of elasticity and glass transition temperature properties of the dried and cured coating of the ESD composition.

Preferably, after drying, but without curing (crosslinking), the glass transition temperature of a coating (about 2.5 microns thick) of the aqueous carrier dispersion, and consequently of the dried, but not cured, ESD coating (also about 2.5 microns thick), ranges from about −52° C. to about −25° C. Also, after drying and curing (crosslinking) the glass transition temperature of a coating (about 2.5 microns thick) of the aqueous carrier dispersion, and consequently of the dried, cured ESD coating (also about 2.5 microns thick), ranges from about −47° C. to about +21 ° C.

Also, the ESD coating and the ESD film, after application, drying, and curing of the ESD composition, preferably have a hardness of at least about H to about 2H, as determined using the pencil hardness test that is conducted in accordance with ASTM Standard No. 3363-92a. Such a hardness helps to minimize or even prevent damage to the ESD film and the ESD coating that could potentially diminish the excellent surface resistivities of the ESD coating and the ESD film that are achieved by the present invention.

Furthermore, the dried and cured ESD coating should have an adequate degree of tensile strength to avoid breakage or crazing during the hot, stretching conditions present during thermoforming operations to avoid cracking or crazing the ESD coating and any consequent loss of the desired surface resistivity properties in the thermoformed ESD coating. The tensile strength of the ESD coating, after drying and curing, may be considered to be the same, or essentially the same, as the tensile strength of the aqueous carrier dispersion, after drying and curing of the crosslinkable polymer, since the tensile strength properties of the crosslinked polymer will fully dominate the minor or even negligible contribution of the blend of the conductive polymer and the counter ion polymer to the tensile strength properties of the dried and cured coating of the ESD composition. Therefore, after drying and curing (such as overnight at 25° C. and 55% relative humidity), the tensile strength of a coating (about 2.5 microns thick) of the aqueous carrier dispersion, and consequently of the dried, cured ESD coating (also about 2.5 microns thick), should be greater than about 6000 pounds per square inch (psi), and should preferably range from about 6,000 psi and to about 6,700 psi to avoid breakage of the ESD coating during the thermoforming operations.

The modulus of elasticity, in tensile mode (at 100% elongation), and the degree of elongation, at breakage, of the ESD coating, after drying and curing, may be considered to be the same, or essentially the same, as the modulus of elasticity, in tensile mode (at 100% elongation), and the degree of elongation, at breakage of the aqueous carrier dispersion, after drying and curing of the crosslinkable polymer, since the modulus of elasticity, in tensile mode (at 100% elongation), and the degree of elongation, at breakage, of the crosslinked polymer will fully dominate the minor or even negligible contribution of the blend of the conductive polymer and the counter ion polymer to the modulus of elasticity, in tensile mode (at 100% elongation), and the degree of elongation, at breakage, of the dried and cured coating of the ESD composition.

Preferably, the modulus of elasticity, in tensile mode (at 100% elongation), of a coating (about 2.5 microns thick) of the aqueous carrier dispersion, and consequently of the dried, cured ESD coating (also about 2.5 microns thick), should be between about 930 and about 5,100 pounds per square inch (psi) to accommodate the large deformations imposed upon the ESD coating during the thermoforming operation. Additionally, the dried and cured ESD coating should have a degree of elongation, at breakage, that allows the dried and cured ESD coating to deform without breakage during the thermoforming operation. Ordinarily, an elongation at breakage for a coating (about 2.5 microns thick) of the aqueous carrier dispersion, and consequently for the dried, cured ESD coating (also about 2.5 microns thick), that ranges from about 150% to about 320% is adequate to assure that the ESD coating will be capable of deformation without breakage during the thermoforming operation.

The thermal expansion coefficients of the ESD coating, after drying and curing and also after thermoforming, may be considered to be the same, or essentially the same, as the thermal expansion coefficients of the aqueous carrier dispersion, after drying and curing of the crosslinkable polymer and after thermoforming of the crosslinked polymer, respectively, since the thermal expansion coefficient of the crosslinked polymer will fully dominate the minor or even negligible contribution of the blend of the conductive polymer and the counter ion polymer to the thermal expansion coefficients of the dried and cured coating of the ESD composition and of the thermoformed coating of the ESD composition, respectively.

Those of ordinary skill in the art will recognize that the dried and cured ESD coating should have an appropriate thermal expansion coefficient during thermoforming that is compatible with the particular material of the plastic web or sheet to avoid delamination of the ESD coating and the plastic web or sheet during thermoforming operations. Furthermore, after thermoforming, the ESD coating should have a thermal expansion coefficient that is compatible with the material of the plastic sheet or web to prevent delamination of the ESD coating from the plastic web or sheet under conditions of use over the period of time of expected use of the ESD packaging material.

PROPERTY DETERMINATION AND CHARACTERIZATION TECHNIQUES

Viscosity

Unless otherwise indicated, all viscosity determinations recited herein are based upon the following procedure that uses a Brookfield Model DV-III programmable rheometer that is equipped with an adapter for small samples. The Brookfield Model LVDH-I+ rheometer is available from Brookfield Engineering Laboratories, Inc. of Stoughton, Mass.

The viscosity (the "Brookfield viscosity") of a particular sample of fluid is determined with the fluid, such as the ESD composition, at room temperature (about 25° C.). About five grams of the particular fluid being tested are placed in the small sample adapter which is positioned within the viscosity measurement cell of the rheometer. An appropriate spindle, identified by a spindle number and selected so that the measured viscosity is within the range of the particular spindle, is positioned within the small sample adaptor within the measurement cell. The Brookfield viscosity is measured while running the selected spindle at a revolution per minute (RPM) rate that is selected based upon calibration studies conducted at the direction of the inventor. For viscosity determinations and specifications of this disclosure, the Spindle No. 2 is selected and is rotated at about 20 RPM during viscosity determinations, unless otherwise specified.

Transparency and Haze

Unless indicated otherwise, all transparency (i.e.; percent light transmittance) and all haze determinations are based upon ASTM Standard No. D-1003 using a Hunter Lab COLORQUEST® II Sphere spectrophotometer that is available from Hunter Associates Laboratory, Inc. of Reston, Va. The ASTM Standard No. D-1003 was followed in determining the percentage transmission and the percentage of haze unless the procedure manual accompanying the Hunter Lab COLORQUEST® spectrophotometer specified otherwise. The transparency and haze determinations were conducted using visible light with a wavelength ranging from about 410 nanometers to about 700 nanometers. All percentage transmittance and all percentage haze determinations are based on samples having a total thickness of about 2.5 microns, unless otherwise specified.

Surface Resistivity

Unless indicated otherwise, all surface resistivity measurements are conducted in accordance with ESD Association Standard S11.11- 1993 entitled *Surface Resistance Measurement Of Static Dissipative Planar Materials* (sometimes referred to as EOS/ESD Standard S11.11-1993) using an ETS model No. 803B resistance/resistivity probe that is available from Electro-Tech Systems, Inc. of Glenside, Pa. An ETS model No. 821 resistance/resistivity probe that is available from Electro-Tech Systems is used to measure surface resistivity in tight corners of thermoformed articles.

Surface Ion Contaminants

Unless otherwise indicated, all determinations of surface ion contamination were conducted in accordance with Specification No. 019-6650 of Hutchinson Technology, Inc. of Hutchinson, Minn. Surface ion contamination determinations conducted in accordance with Specification No. 019-6650 of Hutchinson Technology may be obtained using Katz Analytical Services of 11415 Valley View Road in Eden Prairie, Minn.

pH

Unless otherwise specified, the pHs of the aqueous conductive polymer dispersion, the aqueous carrier dispersion, the ESD composition, and any other samples are determined using a Cole-Parmer Model No. 59000-30 pH meter that is available from Cole-Parmer Instrument Company of Vernon Hills, Ill. The pHs are determined in accordance with the procedure manual accompanying the Cole-Parmer Model No. 59000-30 pH meter.

Hardness

Unless stated otherwise, all hardness values of the ESD coating and the ESD film, after application, drying, and curing of the ESD composition, are based upon the pencil hardness test that is conducted in accordance with ASTM Standard No. D3363-92a that is titled *Standard Test Method for Film Hardness by Pencil Test*.

Glass Transition Temperature

The glass transition temperature of a particular sample may be obtained using either of the following two procedures:

ASTM Standard No. E1545-95a: *Standard Test Method For Assignment Of The Glass Transition Temperature By Thernomechanical Analysis*; or ASTM Standard No. E1356-98: *Standard Test Method For Assignment Of The Glass Transition Temperatures By Differential Scanning Calorimetry Or Differential Thermal Analysis.*

The analysis procedure of ASTM Standard No. E1545-95a may be conducted using analytical equipment obtained from Mettler-Toledo, Inc. of Columbus, Ohio. The analysis procedure of ASTM Standard No. E1356-99 may be conducted using analytical equipment obtained from PerkinElmer LLC of Norwalk, Conn. The procedures of ASTM Standard No. E1545-95a and ASTM Standard No. E1356-99 have been found to each give very close results to each other for determinations of the glass transition temperature of a particular sample. The procedures of ASTM Standard No. E1545-95a and ASTM Standard No. E1356-99 should each be conducted with a heating rate of about 10° C. per minute.

A particular coating or film may be prepared for the glass transition temperature determination by applying the composition used to make the particular film or coating onto a substrate. If the glass transition temperature desired is for the film or coating that has been dried and cured, the film or coating, after drying and curing of the composition, is peeled off the substrate and thereafter tested for the glass transition temperature property. If the glass transition temperature desired is for the film or coating that has been dried, but not cured, the film or coating, after drying of the composition, is peeled off the substrate and thereafter tested for the glass transition temperature property. If the coating or film bonds to the substrate such that the film or coating cannot be peeled off the substrate without tearing or otherwise damaging the film or coating, the coating or film should be formed on an alternative substrate, such as a ceramic substrate, to which the film or coating does not bond.

Thermal Expansion Coefficient

The thermal expansion coefficient for a sample of a particular film or coating may be obtained using the procedure of ASTM Standard No. E831-93: *Standard Test Method For Linear Thernal Expansion Of Solid Materials By Thermomechanical Analysis*. A particular coating or film may be prepared for the thermal expansion coefficient determination by applying the composition used to make the particular film or coating onto a substrate. The film or coating that has been dried and cured is then peeled off the substrate and thereafter tested for the thermal expansion coefficient property. If the coating or film bonds to the substrate such that the film or coating cannot be peeled off the substrate without tearing or otherwise damaging the film or coating, the coating or film should be formed on an alternative substrate, such as a ceramic substrate, to which the film or coating does not bond.

Tensile Properties

The tensile properties (modulus of elasticity in tensile mode at 100% elongation, tensile strength, and elongation at breakage) for a sample of a particular film or coating may be obtained using the procedure of ASTM Standard No. D2370-98: *Standard Test Method For Tensile Properties Of Organic Coatings*. A particular coating or film may be prepared for the tensile properties determination by applying the composition used to make the particular film or coating onto a substrate. The film or coating that has been dried and cured is then peeled off the substrate and thereafter tested for the various tensile properties. If the coating or film bonds to the substrate such that the film or coating cannot be peeled off the substrate without tearing or otherwise damaging the film or coating, the coating or film should be formed on an alternative substrate, such as a ceramic substrate, to which the film or coating does not bond.

EXAMPLES

The following examples are presented to describe ESD coatings, ESD packaging materials, and/or ESD films that are prepared in accordance with the present invention. These examples are presented for purposes of illustration only and are not to be construed as limiting the scope of the present invention.

Example 1

This example demonstrates preparation of the ESD composition, application of the ESD composition onto a sheet of plastic to form an ESD laminate and drying and curing of the applied coating of the ESD composition, followed by thermoforming of the ESD laminate to form a box-shaped container of the ESD packaging material. First, Bayer TP A1 4071 conductive polymer dispersion (conductive poly(4,4-ethylene) dioxythiophene/polystyrene sulfonate powder finally dispersed in deionized distilled water) was placed in a mixing vessel. Next, n-methyl-2-pyrrolidone was combined with the conductive polymer dispersion in the beaker. Then, triethylamine was added to the beaker in drop-wise fashion, while pausing after every few drops to gentle mix the added triethylarnine until the pH of the solution in the beaker stabilized.

The mixture of the conductive polymer dispersion, the triethylamine, and the n-methyl-2-pyrrolidone was mixed in the beaker for about 2 minutes with light agitation to obtain a uniform blend of the conductive polymer dispersion, the triethylamine, and the n-methyl-2-pyrrolidone. Thereafter, Bayer BAYHYDROL® 123 polyurethane dispersion was added to the blend of the conductive polymer dispersion, the triethylamine, and the n-methyl-2-pyrrolidone in the beaker. The contents of the beaker were mixed in the beaker for about 5 minutes with light agitation to obtain a uniform blend of the conductive polymer dispersion, the triethylamine, the n-methyl-2-pyrrolidone, and the polyurethane dispersion. The weight percentages of these four components that were added to the beaker are presented in Table 2 below:

TABLE 2

| COMPONENT | WEIGHT (Grams) | WEIGHT PERCENT* |
|---|---|---|
| Bayer TP A1 4071 conductive polymer dispersion | 1423.0 ± 2.0 | 71.0 to 71.3 |
| Bayer BAYHYDROL ® 123 polyurethane dispersion | 471.0 ± 2.0 | 23.4 to 23.6 |
| triethylamine | 6.8 ± 0.3 | 0.3 to 0.4 |
| n-methylpyrrolidone | 100.0 ± 1.0 | 4.9 to 5.1 |

*Based on the total weight of all components

This ESD composition had a pH of about 7.47 and a Brookfield viscosity of about 80 milliPascals-seconds at an ESD composition temperature of room temperature (about 25° C.). The density of this ESD composition was about 1.011 grams per cubic centimeter.

This ESD composition was applied as an ESD coating on a 23 mil thick sheet of polyethylene terephthalate glycol (PETG) using a #6 standard wire-wounds steel rode (Mier's bar). The applied coating of the ESD composition was then dried to drive off water and n-methyl pyrrolidone and cured. Drying first occurred in air at room temperature for about 15 minutes followed by curing and more drying in an oven at about 60° C. for approximately 30 minutes.

The dried and cured ESD coating on the PETG sheet was determined to be about 2.5 microns thick. The surface resistivity of the dried and cured ESD coating was determined to be about $1.5 \times 10^5$ ohms per sq. The glass transition temperature ($T_g$) of the ESD coating, after being dried, but before being cured, was determined to be about −52° C. Also, the glass transition temperature ($T_g$) of the dried and cured ESD coating was determined to be about −47° C.

In preparation for thermoforming, the laminate of the dried and cured ESD coating on the PETG sheet was then placed in a 450° F. oven for about 38 seconds until the temperature of the laminate reached about 240° F. The heated laminate that was at 240° F. was then vacuum molded under a vacuum of about 40 pounds per square inch (psi) to shape the laminate and form the ESD packaging material.

The surface resistivity of the ESD coating after the thermoforming operation was determined to be about $7.0 \times 10^7$ ohms/sq. at a coating temperature of about 143.5° C. The ESD packaging material (laminate of the ESD coating on the PETG sheet with a total laminate thickness of about 23 mils) was determined to transmit about 89.7% of visible light with a wavelength ranging from about 410 nanometers to about 700 nanometers that was applied to the laminate. Additionally, the concentrations of various ions at the surface of the ESD coating, following thermoforming of the ESD laminate, were determined to have the values presented in Table 3 below:

TABLE 3

| Ion | Concentration (micrograms per square centimeter) |
|---|---|
| Fluoride | 0.0004 |
| Chloride | 0.002 |
| Nitrite | 0.002 |
| Bromide | 0.002 |
| Nitrate | 0.002 |
| Phosphate | 0.002 |
| Sulfate | 0.002 |

Example 2

This example demonstrates application of the ESD composition prepared in accordance with Example 1 onto three different plastic sheets made of three different polymers, followed by thermoforming of each of these three different ESD laminates. The ESD composition prepared in accordance with Example 1 was drawn down onto both sides of the three different plastic sheets using a #5 standard wire-wound steel rod to produce the ESD coatings on the three different sheets. Each of the plastic sheets was about 0.030 inches thick, prior to application of the ESD composition. One of the sheets was made of PETG, another of the sheets was made of polyvinyl chloride (PVC) and the third sheet was a BAREX® 210E sheet. The BAREX® 210E sheet was made of acrylonitrile-methyl acrylate copolymer and may be obtained from BP Chemicals, Inc. of Warrensville Heights, Ohio.

The applied coatings of the ESD composition on the three different plastic sheets were then dried to drive off water and n-methyl pyrrolidone and cured. Drying first occurred in air at room temperature for about 15 minutes followed by curing and more drying in an oven at about 60° C. for approximately 30 minutes.

The dried and cured ESD coatings on the three different plastic sheets were each determined to be about 2.5 microns thick per side, recalling that both sides of each plastic sheet were coated. The laminates that included the dried ESD coatings were each determined to be highly transparent (i.e.; about 29% haze) and had good dissipative properties (i.e. each laminate had a surface resistivity of about $10^8$ ohms/sq.).

Each of the ESD laminates were heated in a 450° F. oven for a period of about 38 seconds until the temperature of the laminates each reached about 240° F. in preparation for thermoforming. The heated laminates were then each vacuum molded using conventional vacuum molding equipment at a vacuum of about 40 psi to form the ESD packaging material as a box-shaped container with a measurement of about 4 inches by 6 inches by 1 inch. Each of the three different ESD packaging materials, after the thermoforming process, retained good transparency (i.e. about 35% haze) and good dissipative properties (i.e. a surface resistivity of about $10^9$ ohms/sq.).

Example 3

This example demonstrates the minimal effects that changing humidity has on ESD laminates prepared in accordance with the present invention. The ESD composition was prepared as detailed above in Example 1, was applied on one side of a clear PETG sheet as detailed in Example 1 above, and was dried and cured as detailed in Example 1 above to form an ESD laminate. The surface resistivity of the dried and cured ESD coating was determined to be about $6.5 \times 10^4$ ohms/sq.

The ESD laminate that included the dried and cured ESD coating was then placed in a humidity chamber with a relative humidity of about 80% at room temperature (about 25° C.). After a period of about 30 days in the humidity chamber, the surface resistivity of the dried and cured ESD coating only increased slightly to about $1.6 \times 10^5$ ohms/sq. The relative humidity in the humidity chamber was then dropped to about 5%, while keeping the temperature at room temperature. The surface resistivity of the dried and cured ESD coating remained unchanged at about $1.6 \times 10^5$ ohms/sq. after about 30 days in the humidity chamber at the relative humidity of about 5%.

Example 4

This example demonstrates the minimal effects that elevated temperatures have on ESD laminates prepared in accordance with the present invention.

The ESD composition prepared as detailed above was applied on one side of a two different clear polycarbonate sheets using a #6 standard wire-wounds steel rode (Mier's bar). The applied coating of the ESD composition was then dried to drive off water and n-methyl pyrrolidone and cured. Drying first occurred in air at room temperature for about 15 minutes followed by curing and more drying in an oven at about 60° C. for approximately 30 minutes.

The dried and cured ESD coatings on the two polycarbonate sheets were each determined to be about 2.5 microns thick. The surface resistivity of the dried and cured ESD coatings were determined to be about $8.3 \times 10^4$ ohms/sq. for both coated polycarbonate sheets. One of the coated polycarbonate sheets consisting of the ESD laminate with the dried and cured ESD coating was then placed in an oven with a relative humidity of about 35% at a temperature of about 100° C. After a period of 30 days in the 100° C. oven, the surface resistivity of the ESD coating only increased slightly to about $5.6 \times 10^5$ ohms/sq.

The second coated polycarbonate sheet consisting of the ESD laminate with the dried and cured ESD coating was placed in an oven with a relative humidity of about 35% at a temperature of about 125° C. Over a period of 30 days, the surface resistivity of the ESD coating on this second coated polycarbonate sheet was determined to have changed in accordance with the measurements presented in Table 4 below:

TABLE 4

| Measurement Taken How Long After Placement In Oven? | Surface resistivity (ohms/square) |
|---|---|
| 20 minutes | $8.5 \times 10^4$ |
| 4 hours | $5.3 \times 10^7$ |
| 24 hours | $1.1 \times 10^8$ |
| 1 week | $4.0 \times 10^8$ |
| 30 days | $>10^{12}$ |

Although the present invention has been described with reference to preferred embodiments, workers skilled in the art will recognize that changes may be made in form and detail without departing from the spirit and scope of the invention.

What is claimed is:

1. A method of forming an article, the method comprising:
   adding a conductive polymer to a vessel;
   adding a crosslinkable polymer to a vessel;
   adding a crosslinking agent to the vessel;
   blending the conductive polymer, the crosslinkable polymer, water, and the crosslinking agent together to form a dispersion, each component of the dispersion, other than water, having a vapor pressure of about 400 mm Hg, or less, at a temperature of about 72° F.;
   applying a coating of the dispersion onto a substrate; and
   drying and curing the coating of the dispersion wherein:
      the dried and cured coating of the dispersion, when having a thickness of about 2.5 microns, is capable of permitting at least 95% transmission of visible light with a wavelength ranging from about 410 nanometers to about 700 nanometers;
      the surface resistivity of the dried and cured coating of the dispersion increases by about $9.5 \times 10^4$ ohms/square, or less, after storage of the dried and cured coating of the dispersion for at least about 30 days in a humidity chamber at a temperature of about 25° C. and a relative humidity of about 80%, as compared to the surface resistivity of the dried and cured coating of the dispersion prior to placement in the humidity chamber; and
      the surface resistivity of the dried and cured coating of the dispersion increases by about $4.8 \times 10^5$ ohms/square, or less, after storage of the dried and cured coating of the dispersion for at least about 30 days in a humidity of about 80%, as at a temperature of about 100° C. and a relative humidity of about 35%, as compared to the surface resistivity of the dried and cured coating of the dispersion prior to placement in the humidity chamber.

2. The method of claim 1 wherein:
   the article comprises the substrate and the dried and cured coating of the dispersion; and
   the substrate comprises a sheet or web of plastic.

3. The method of claim 1 wherein the substrate comprises is a vehicle component and the dried and cured coating of the dispersion comprises a primer that is capable of accepting a coat of paint.

4. The method of claim 1 wherein the substrate is an electronic component, the method further comprising adjusting the pH of the dispersion to about 7 to about 9, prior to applying the coating of the dispersion on the article.

5. The method of claim 1 wherein the dispersion comprises at least about 75 weight percent water, based upon the total weight of the dispersion.

6. The method of claim 1 wherein the dispersion is free of volatile organic compounds.

7. The method of claim 1 wherein the conductive polymer comprises a polythiophene.

8. The method of claim 7 wherein the polythiophene comprises poly(3,4-ethylene) dioxythiophene.

9. The method of claim 1 wherein the conductive polymer is derived form a polythiophene.

10. The method of claim 9 wherein the polythiophene comprises poly(3,4-ethylene) dioxythiophene.

11. The method of claim 1 wherein the crosslinkable polymer comprises a blocked urethane polymer.

12. The method of claim 11 wherein the blocked urethane polymer comprises one or more carbonate groups.

13. The method of claim 1, the method further comprising combining an ionic polymer with the conductive polymer prior to the addition of the crosslinking polymer to the vessel.

14. The method of claim 13 wherein the ionic polymer is a counter polymer.

15. The method of claim 13 wherein the ionic polymer comprises polystyrene sulfonate.

16. The method of claim 1 wherein the crosslinking agent comprises an amine.

17. The method of claim 1, the method further comprising incorporating a water-miscible organic solvent in the dispersion prior to blending.

18. The method of claim 1 wherein the dispersion is capable of being formed into a dry film that exhibits a surface concentration of less than about 0.06 micrograms of fluoride ion per square meter, a surface concentration of less than about 0.005 micrograms of chloride ion per square meter, a surface concentration of less than about 0.003 micrograms of fluoride ion per square meter, a surface concentration of less than about 0.01 micrograms of bromide ion per square meter, a surface concentration of less than about 0.08 micrograms of nitrate ion per square meter, a surface concentration of less than about 0.02 micrograms of phosphate ion per square meter, and a surface concentration of less than about 0.02 micrograms of sulfate ion per square meter.

19. A method of forming an article, the method comprising:
   combining a conducive polymer and water to form a conductive polymer dispersion;
   forming a carrier dispersion, the carrier dispersion comprising a crosslinkable polymer
   combining the conductive polymer dispersion, the carrier dispersion, and a crosslinking agent to form an electrostatic dissipative composition; wherein:
      each component of the electrostatic dissipative composition, other than water, have a vapor pressure of about 400 mm Hg or less, at a temperature of about 72° F.;
      the electrostatic dissipative composition is capable of being formed into a dry film:
         with a thickness of about 2.5 microns that exhibits a surface resistivity in the range of about $10^4$ ohms/square to about $10^{12}$ ohms/square and permits at least about 95% transmission of visible light with a wavelength ranging from about 410 nanometers to about 700 nanometers; and
         that exhibits a surface concentration of less than about 0.06 micrograms of fluoride ion per square meter, a surface concentration of less than about 0.005 micrograms of chloride ion per square meter, a surface concentration of less than about 0.003 micrograms of nitrite ion per square meter, a surface concentration of less than about 0.01 micrograms of bromide ion per square meter, a surface concentration of less than about 0.08 micrograms of nitrate ion per square meter, a surface concentration of less than about 0.02 micrograms of phosphate ion per square meter, a surface concentration of less than about 0.02 micrograms of sulfate ion per square meter;
   applying a coating of the electrostatic dissipative composition onto a substrate; and
   drying and curing the coating of the electrostatic dissipative composition.

20. The method of claim 19 wherein:
   the article comprises the substrate and the dried and cured coating of the electrostatic dissipative composition; and
   the substrate comprises a sheet or web of plastic.

21. The method of claim 19 wherein the surface resistivity of the dried and cured coating of the electrostatic dissipative composition increases by about $9.5 \times 10^4$ ohms/square, or less, after storage of the dried and cured coating of the electrostatic dissipative composition for at least about 30 days in a humidity chamber at a temperature of about 25° C. and a relative humidity of about 80%, as compared to the surface resistivity of the dried and cured coating of the electrostatic dissipative composition prior to placement in the humidity chamber.

22. The method of claim 19 wherein the surface resistivity of the dried and cured coating of the electrostatic dissipative composition increases by about $4.8 \times 10^4$ ohms/square, or less, after storage of the dried and cured coating of the electrostatic dissipative composition for at least about 30 days in a humidity chamber at a temperature of about 100° C. and a relative humidity of about 35%, as compared to the surface resistivity of the dried and cured coating of the electrostatic dissipative composition prior to placement in the humidity chamber.

23. The method of claim 19 wherein the substrate comprises is a vehicle component and the dried and cured coating of the electrostatic dissipative composition comprises a primer that is capable of accepting a coat of paint.

24. The method of claim 19 wherein the substrate is an electronic component, the method further comprising adjusting the pH of the electrostatic dissipative composition to about 7 to about 9, prior to applying the coating of the electrostatic dissipative composition on the article.

25. The method of claim 19 wherein the electrostatic dissipative composition comprises at least about 75 weight percent water, based upon the total weight of the electrostatic dissipative composition.

26. The method of claim 19 wherein the electrostatic dissipative composition is free of volatile organic compounds.

27. The method of claim 19 wherein the conductive polymer comprises a polythiophene.

28. The method of claim 27 wherein the polythiophene comprises poly(3,4ethylene) dioxythiophene.

29. The method of claim 19 wherein the conductive polymer is derived from a polythiophene.

30. The method of claim 29 wherein the polythiophene comprises poly(3,4ethylene) dioxythiophene.

31. The method of claim 19 wherein the crosslinkable polymer comprises a blocked urethane polymer.

32. The method of claim 31 wherein the blocked urethane polymer comprises one or more carbonate groups.

33. The method of claim 19, the method further comprising incorporating an ionic polymer in the conductive polymer dispersion.

34. The method of claim 33 wherein the ionic polymer is a counter ion polymer.

35. The method of claim 33 wherein the ionic polymer comprises polysturene sulfonate.

36. The method of claim 19 wherein the crosslinking agent comprises an amide.

37. The method of claim 19, the method further comprising incorporating a water-miscible organic solvent in the electrostatic dissipative composition prior to blending.

* * * * *